United States Patent [19]
Yuan

[11] Patent Number: 6,160,665
[45] Date of Patent: Dec. 12, 2000

[54] HIGH EXTINCTION RATIO POLARIZATION BEAMSPLITTER

[75] Inventor: Shifu Yuan, Painted Post, N.Y.

[73] Assignee: Chorum Technologies Inc., Richardson, Tex.

[21] Appl. No.: 09/326,247

[22] Filed: Jun. 4, 1999

[51] Int. Cl.$^7$ .......................... G02B 27/14; G02B 27/28
[52] U.S. Cl. ...................... 359/629; 359/487; 359/494; 359/495; 359/496; 359/497
[58] Field of Search .................................. 359/487, 494, 359/495, 496, 497, 629

[56] References Cited

U.S. PATENT DOCUMENTS

| | | | |
|---|---|---|---|
| 4,504,123 | 3/1985 | Smith | 350/394 |
| 5,245,472 | 9/1993 | Hegg | 359/464 |
| 5,596,661 | 1/1997 | Henry et al. | 385/24 |
| 5,680,490 | 10/1997 | Cohen et al. | 385/24 |
| 5,694,233 | 12/1997 | Wu et al. | 359/117 |
| 5,777,788 | 7/1998 | Noguchi | 359/487 |
| 5,809,190 | 9/1998 | Chen | 385/43 |
| 5,867,291 | 2/1999 | Wu et al. | 359/124 |
| 5,900,976 | 5/1999 | Handschy et al. | 359/495 |
| 5,943,167 | 8/1999 | Kelly | 359/487 |
| 5,959,773 | 9/1999 | Gagnon | 359/495 |

OTHER PUBLICATIONS

Analysis of a Tunable Multichannel Two–Mode–Interference Wavelength Division Multiplexer/Demultiplexer—Youngchul Chung, Jong Chang Yi, Sun Ho Kim, and Sang Sam Choi; Jornal of Lightwave Technology, vol. 7, No. 5, May 1998.

Optical FDM Transmission Technique—Kiyoshi Nosu, Hiromu Toba, and Katsushi Iwashita; Jornal of lightwave Technology, vol. LT–5, No. 9, Sep. 1987.

A Four–Channel Optical Waveguide Multi/Demultiplexer for 5–Ghz Spaced Optical FDM Transmission—Kyo Inoue, Norio Takato, Hiromu Toba, and Masao Kawachi; Journal of Lightwave Technology, vol. 6, No. 2, Feb. 1988.

*Primary Examiner*—Georgia Epps
*Assistant Examiner*—David N. Spector
*Attorney, Agent, or Firm*—Fulbright & Jaworski L.L.P.

[57] ABSTRACT

A system, method and apparatus for performing optical beamsplitting are disclosed. In a preferred embodiment, a high extinction ratio polarization beamsplitter comprises at least two polarized beamsplitting surfaces that are aligned parallel to each other. The beamsplitter receives a first input light beam that is incident on a first polarized beamsplitting surface. The beamsplitter receives a second input light beam that is also incident on the first polarized beamsplitting surface. In a preferred embodiment, the first and second input light beams have a cross point that is not incident on such first polarized beamsplitting surface. Further, in a preferred embodiment, each of the first and second input light beams are incident on such first polarized beamsplitting surface at a point that is not its center point. Cross talk noise is reduced in a preferred embodiment by directing resulting noise to a point that is not co-linear with an output signal. Further, cross talk noise is reduced in a preferred embodiment by directing noise such that the noise incurs a polarized beamsplitting surface multiple times, each reducing the noise level.

20 Claims, 7 Drawing Sheets

HIGH EXTINCTION RATIO POLARIZATION BEAMSPLITTER

RELATED APPLICATIONS

The present application which is related to co-pending application Ser. No. 09/326,201, filed Jun. 4, 1999, entitled "OPTICAL ADD/DROP WAVELENGTH SWITCH USING A HIGH EXTINCTION POLARIZATION BEAMSPLITTER", which is hereby incorporated herein by reference; application Ser. No. 09/326,250, filed Jun. 4, 1999, entitled "N×M DIGITALLY PROGRAMMABLE OPTICAL ROUTING SWITCH USING HIGH EXTINCTION RATIO POLARIZATION BEAM SPLITTER," which is hereby incorporated herein by reference; application Ser. No. 09/326,251, filed Jun. 4, 1999, entitle "FIBER OPTIC SMART SWITCH," which is hereby incorporated herein by reference.

TECHNICAL FIELD

The present invention relates in general to optical communications systems, and in specific to optical elements used in optical networks for wavelength division multiplex (WDM) optical communications.

BACKGROUND

WDM optical communications systems that can carry information at rates up to terabits per second are becoming the next wave in optical communications development. In current WDM systems, information is optically coded within each of the WDM channels and the network is linked using a point-to-point architecture. Signal routing and switching are performed electronically (i.e., optical information is translated back to electronic format and then processed at each network node). As data rates increase, these opto-electronic and electro-optic conversions are becoming the bottleneck for the network. To improve the efficiency and reduce the cost of networks, routing and switching performed in the optical domain are preferred.

A wide variety of electromagnetic field-controlled optical switches are commercially available. They are based on mechanical, electro-optic, thermo-optic, acousto-optic, magnetooptic, and semiconductor technologies. Each switching technology has its own advantages, but also has drawbacks as well. For example, mechanical switches are the most widely used routing components and provide very low insertion loss and crosstalk characteristics, but their switching time is limited to the millisecond range. They also have a limited lifetime because motor-driven parts are used. LiNbO3 integrated optic switches, on the other hand, offer nanosecond switching times. However, LiNbO3 switches suffer from the disadvantages of relative large insertion loss (5 dB), high crosstalk (20 dB) and polarization dependency.

Accordingly, efforts continue to develop field-controlled optical switches with lower channel crosstalk, reduced polarization dependent loss, and at least moderate reconfiguration speed. It is recognized that these efforts, when successful, can provide an essential component to fiber communication systems.

Figure 1:
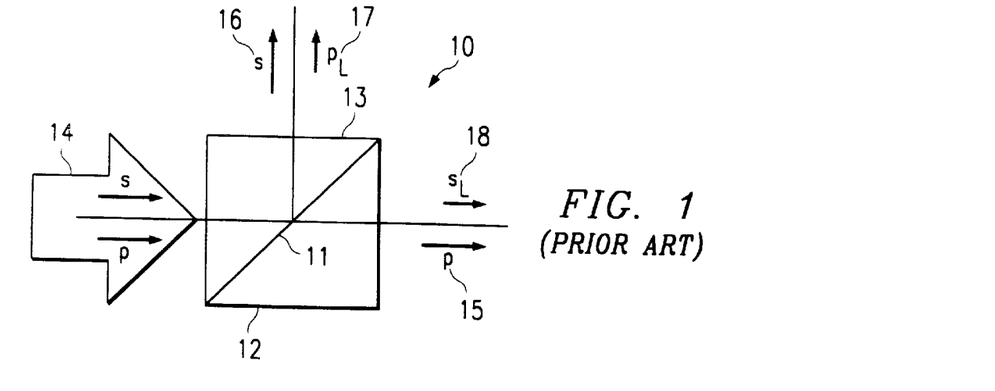
FIG. 1 depicts a prior art polarization beamsplitter (PBS)

A common optical element is a polarization beamsplitter PBS, as shown in FIG. 1. The PBS 10 is comprised of a reflection surface 11 located between two prisms 12, 13. PBS 10 is typically formed by coating the hypotenuse surface of one of the two prisms 12, 13. The hypotenuse surface of the other prism 13, 12 is then attached, via an optical adhesive, to the coated surface. The PBS operates by splitting an incoming beam 14 into its polarization components, specifically the horizontal component 15 (which is also referred to as the p component and sometimes represented as "|") and vertical component 16 (which is also referred to as the s component and sometimes represented as "•"). With an ideal PBS, all of the p light 15 is transmitted (or passes through) and all of the s light 16 is reflected. However, typically PBSs leak light in both directions. In other words some p light is reflected, i.e. $p_L$ 17, and some s light is transmitted, i.e. $s_L$ 18. The ratios of the reflected s light 16 to the leaked, reflected p light RS:$Rp_L$, and the transmitted p light 15 to the leaked, transmitted s light 18, Tp:$Ts_L$, are known as extinction ratios. Typical PBSs have extinction ratios of Rs:$Rp_L$ of about 20 dB and Tp:$Ts_L$ of about 40 dB. The higher the extinction ratio, the better the PBS. Consequently the transmitted extinction ratio Tp:$Ts_L$ is better than the reflected extinction ratio RS:$Rp_L$, which is typical for PBSs. However, note that as long as the leaking signal has a polarization that is different from the actual signal, e.g. s light 16 has a different polarization from the leaking p light, $p_L$ 17, then the leaking light or noise can be filtered off of the signal with a polarization filter or polarizer.

Figure 2:
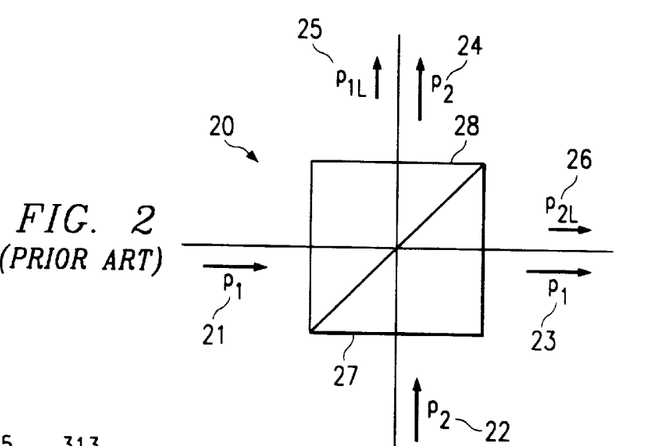
FIG. 2 depicts the PBS of FIG. 1 with two inputs.

The leakage problem or low extinction ratio problem becomes particularly relevant in optical switching systems, wherein a single PBS has two inputs, for example as shown in FIG. 2. Note that in FIG. 2 only the p light is shown for the sake of simplicity, but both inputs may also comprise s light. As shown in FIG. 2, a first input $p_1$ signal 21 is incident on to one surface of PBS 20, and has a transmitted portion $p_1$ 23, which is the intended signal, and a noise portion $p_{1L}$ 25, which represents a reflected portion of the $p_1$ input signal 21. The second input $p_2$ signal 22 is incident on a second surface of the PBS 20, and has a transmitted portion $p_2$ 24, which is the intended signal, and a noise portion $p_{2L}$ 26, which represents a reflected portion of the $p_2$ input signal 22. Note that the cross point 27 (or intersection) of two input signals is located at the beamsplitting surface 28. In this arrangement, the $p_2$ signal 24 and $p_{1L}$ noise 25 have the same polarization and are co-linear. Similarly, the $p_1$ signal 23 and the $p_{2L}$ noise 26 have the same polarization and are co-linear. Consequently, the noise signals cannot be removed from the overlapping signals. Therefore, at each cross point of two input signals, crosstalk noise is injected into the signals. While the noise injected by a single cross point may not be too high for system operations, typical WDM systems may have dozens or even hundreds of cross points, thus noise will quickly accumulate and swamp the input signals. As a result, prior art PBSs are not effectively used in WDM systems.

Therefore, there is a need in the art for a high extinction ratio beamsplitter, such that crosstalk noise is not injected into the input signals.

SUMMARY OF THE INVENTION

In view of the above, there exists a desire for a method, apparatus and system for performing optical beamsplitting. There is a further desire for a method, apparatus and system for performing beamsplitting in a manner that provides a high polarization extinction ratio. Thus, there exists a need for a high extinction ratio beamsplitter, such that crosstalk noise is not injected into input signals.

These and other objects, features and technical advantages are achieved by a system, method, and apparatus which perform optical beamsplitting in a manner such that crosstalk noise is not injected into the beamsplitter's input signals. In a preferred embodiment a polarized beamsplitter (PBS) comprises two polarized beamsplitting surfaces that each have extinction ratios of Tp/Ts>40 dB and Rs/Rp>20 dB. Further, in a preferred embodiment, the two beamsplitting surfaces are arranged such that crosstalk noise from an input beam is directed to a point that is not co-linear with respect to an input light beam signal. Thus, a preferred embodiment reduces crosstalk noise by directing such noise to a point that is off-axis as to a desired output signal. Also, in a preferred embodiment, the two beamsplitting surfaces are arranged such that crosstalk noise from an input signal may incur multiple beamsplitting surfaces. Each time that a beam incurs a beamsplitting surface, the extinction ratio is increased. That is, a resulting noise signal is diminished with each beamsplitting surfaces incurred. As a result, the overall extinction ratio of the beamsplitter is enhanced.

It should be appreciated that a technical advantage of one aspect of the present invention is that a system, method and apparatus for performing optical beamsplitting are provided wherein very little or no crosstalk noise is injected into the input beam signals. Further, it is a technical advantage of one aspect of the present invention that a system, method and apparatus for performing optical beamsplitting are provided wherein multiple polarized beamsplitting surfaces are implemented in a manner that results in very little or no crosstalk noise.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 3:
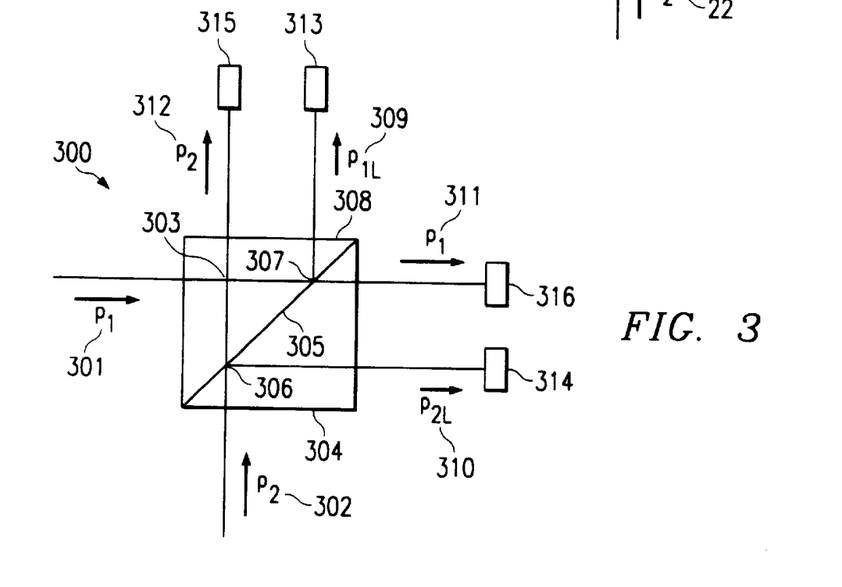
FIG. 3 depicts an inventive PBS with the crosspoint located off of the beamsplitting surface.

FIG. 3 depicts a first aspect of the inventive PBS. As shown in this FIGURE, the PBS 300 is receiving two light inputs, 301 and 302. The input alignment with the PBS has been arranged such that the light inputs are not incident onto the center 305 of the beamsplitting surface 304, but rather are incident onto side portions 306, 307 that are located away from the center 305. Consequently, the cross point 303 is located off of the beamsplitting surface 304, and in the glass or free space of one of the two prisms 308. Thus, the noise signals, $p_{1L}$ 309 and $p_{2L}$ 310 are physically separated from the signals $p_1$ 311 and $p_2$ 312. The noise signals $p_{1L}$ 309 and $p_{2L}$ 310 can then be blocked, filtered, absorbed, or otherwise removed from the system containing PBS 300, via removal elements 313, 314. The signals $p_1$ 311 and $p_2$ 312 would then be passed onto other elements 315, 316 in the system containing PBS 300. Note that this embodiment would only operate properly for p light as s light would follow the same path as the noise and would be removed.

FIGS. 4A to 4D depicts another embodiment of the inventive PBS 400. The PBS 400 is comprised of a high quality glass, such as SF-11, however a high quality plastic could be used if transmission loss is low.

Figure 4A:
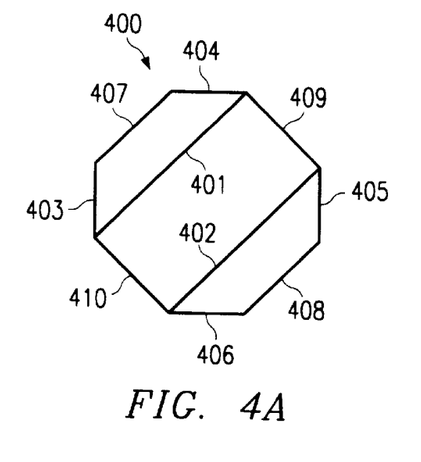
FIGS. 4A to 4D depict another embodiment of the inventive PBS.

As shown in FIG. 4A, this PBS includes two beamsplitting (BS) surfaces 401, 402. These BS surfaces would be coated with multilayered dielectric films, to form polarization BS surfaces. The surface quality of these surfaces should exceed 40:20 (number of scratches:number of pits). Both surfaces would have extinction ratios of Tp/Ts>40 dB and Rs/Rp>20 dB. The PBS 400 further includes four input/output surfaces 403, 404, 405, 406. These surfaces should have an anti-reflective (AR) coating to minimize light loss from reflection during input into and output from the PBS 400. The surface quality of these surfaces should exceed 40:20. The PBS 400 also includes two reflective surfaces 407, 408. These surfaces will be used to pass the p noise signals and the s signals through the BS surfaces 401, 402 multiple times. These reflective surfaces also should have surface qualities that exceed 40:20. The remaining two surfaces, 409 and 410, are the noise surfaces, to which a large portion of noise are directed by the interaction of the BS surfaces 401, 402 and the reflection surfaces 407 and 408. These surfaces could be ground and/or coated with a light absorbing material, or left bare.

Figure 4B:
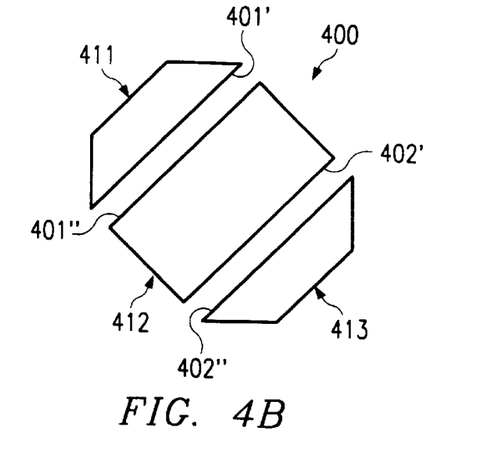

FIG. 4B depicts the three sub-elements 411, 412, 413 used to construct the PBS 400. Note that the BS surface 401 could be located on either sub-element 411 or 412 as depicted as 401' and 401", respectively. Similarly, the BS surface 402 could be located on either sub-element 412 or 413, as depicted as 402' and 402", respectively. The three subelements would be attached together with a high quality optical adhesive.

Figure 4C:
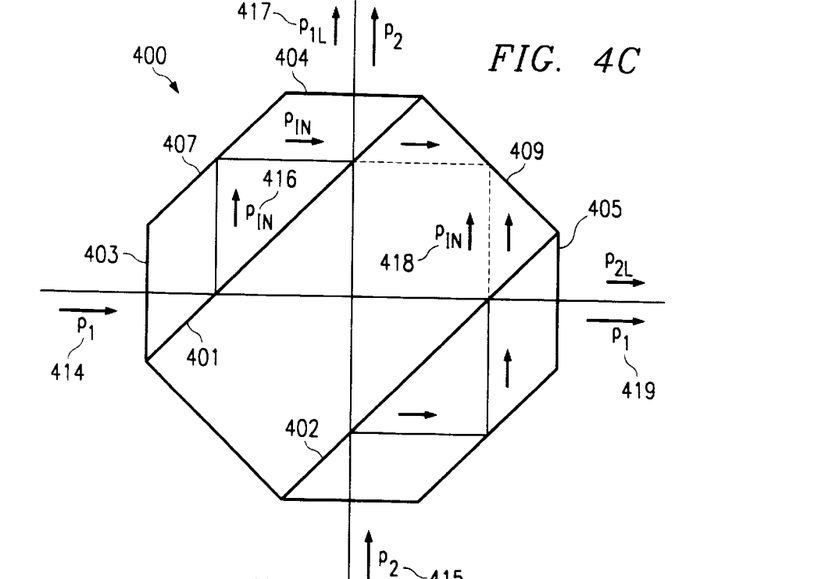

FIG. 4C depicts the passage of p light through the PBS 400 from two p input signals $p_1$ 414 and P2 415. Input $p_1$ 414 enters the PBS 400 through input surface 403 and is incident onto BS surface 401. Note that the point of incidence is off of the center of the BS surface 401. Most of the $p_1$ light passes through the BS surface, but a noise portion $p_{1N}$ 416 is deflected by the BS surface. This noise portion $p_{1N}$ 416 is reflected by reflection surface 407 and again is incident onto BS surface 401. Most of the noise portion $p_{1N}$ 416 passes through the BS surface and is incident onto noise surface 409 where it is removed from the PBS 400. Some of noise portion $p_{1N}$ 416 is deflected by BS surface and exits the PBS 400 as leakage noise $p_{1L}$ 417 along with the $p_2$ signal 415 through output surface 404. This noise portion $p_{1L}$ 417 is crosstalk noise with respect to the second input signal $p_2$, as this noise is a portion of the first input signal $p_1$. Note that the noise portion $p_{1L}$ 417 has resulted from the passage of light through two BS surfaces (as depicted here, through the same surface twice). Since the Rs/Rp extinction ratio is 20 dB per BS surface, $p_{1L}$ 417 has 40 dB.

After passing through BS 401, most of the $p_1$ input light is incident onto the second BS surface 402. Note that the point of incidence is off of the center of the BS surface 402. Most of the p light passes through BS 402 and exits the PBS 400 through output surface 405 as $p_1$ signal 419, but a noise portion $p_{1N}$ 418 is deflected by the BS surface 402 and is incident onto noise surface 409 where it is removed from the PBS 400. The signal path for the second input $p_2$ 415 follows a similar path, but involves surfaces 406, 402, 401, 404, 408, 405, and 409. Thus, the PBS 400 results in a high extinction ratio PBS as the element extinction ratio for Rs/Rp>40 dB.

Figure 4D:
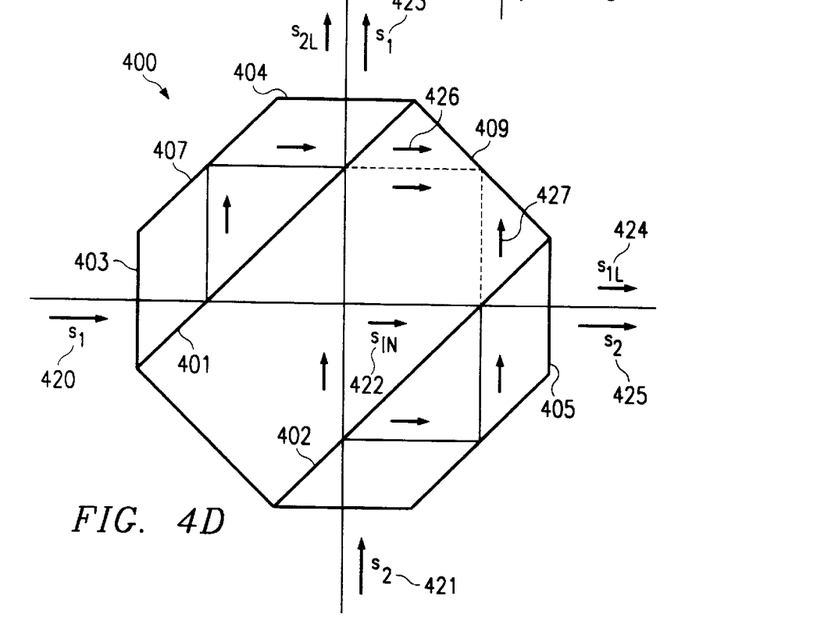

FIG. 4D depicts the passage of s light through the PBS 400 from two s input signals $s_1$ 420 and $s_2$ 421. Input $s_1$ 420 enters the PBS 400 through input surface 403 and is incident onto BS surface 401. Note that the point of incidence is off of the center of the BS surface 401. Most of the s light is deflected by the BS surface 401, and is reflected by the reflection surface 407 and again is incident onto BS surface 401. Most of the incident portion is again deflected by the BS surface 401 where it exits the PBS 400 through output surface 404 as $s_1$ signal 423. Note that at the first deflection, a portion of the $s_1$ input signal passes through the BS surface 401 as noise $s_{1N}$ 422. This noise is incident onto the second BS surface 402, where most of the noise $s_{1N}$ 422 is deflected onto noise surface 409 where it is removed from the PBS 400. Some of noise portion $s_{1N}$ 422 passes through the BS surface 402 and exits the PBS 400 as leakage noise $s_{1L}$ 424 along with the $s_2$ signal 425 through output surface 405. This noise portion $s_{1L}$ 424 is crosstalk noise with respect to the second input signal $s_2$, as this noise is a portion of the first input signal $s_1$. Note that the noise portion $s_{1L}$ 424 has resulted from the passage of light through two BS surfaces. Since the Tp/Ts extinction ratio is 40 dB per BS surface, $s_{1L}$ 424 has 80 dB. At the second incidence of the first BS surface 401, a portion of the light passes through the BS surface as noise 426. This noise is incident onto the noise surface 409 where it is removed from the PBS 400. The signal path for the second input $s_2$ 421 follows a similar path, but involves surfaces 406, 402, 408, 405, 401, 404, and 409. Thus, the PBS 400 results in a high extinction ratio PBS as the element extinction ratio for Tp/Ts>80 dB.

FIGS. 5A to 5D depicts another embodiment of the inventive PBS 500. The PBS 500 is comprised of a high quality glass, such as SF-11 glass, however a high quality plastic could be used if transmission loss is low.

Figure 5A:
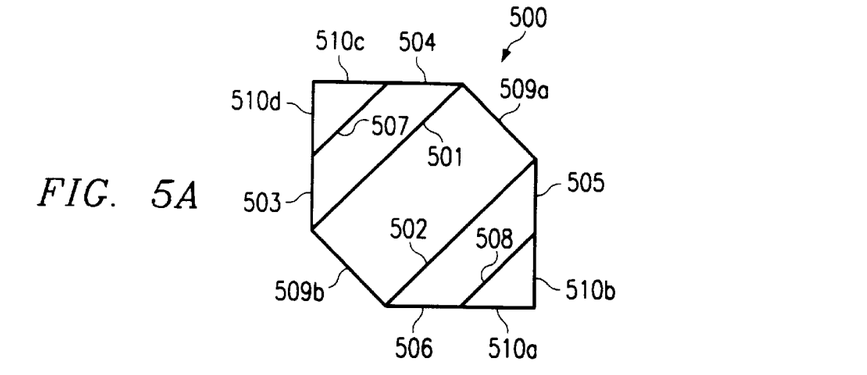
FIGS. 5A to 5D depict another embodiment of the inventive PBS.

As shown in FIG. 5A, this PBS includes four beamsplitting (BS) surfaces 501, 502, 507, and 508. These BS surfaces would be coated with multi-layer dielectric films, to form polarization BS surfaces. The surface quality of these surfaces should exceed 40:20. Both surfaces would have extinction ratios of Tp/Ts>40 dB and Rs/Rp>20 dB. The PBS 500 further includes four input/output surfaces 503, 504, 505, 506. These surfaces should have an anti-reflective (AR) coating to minimize light loss from reflection during input into and output from the PBS 500. The surface quality of these surfaces should exceed 40:20. The remaining surfaces, 509a, 509b, 510a, 510b, 510c, and 510d, are the noise surfaces, to which a large portion of noise are directed by the interaction of the BS surfaces. These surface s could be ground and/or coated with a light absorbing material, or left bare.

Figure 5B:
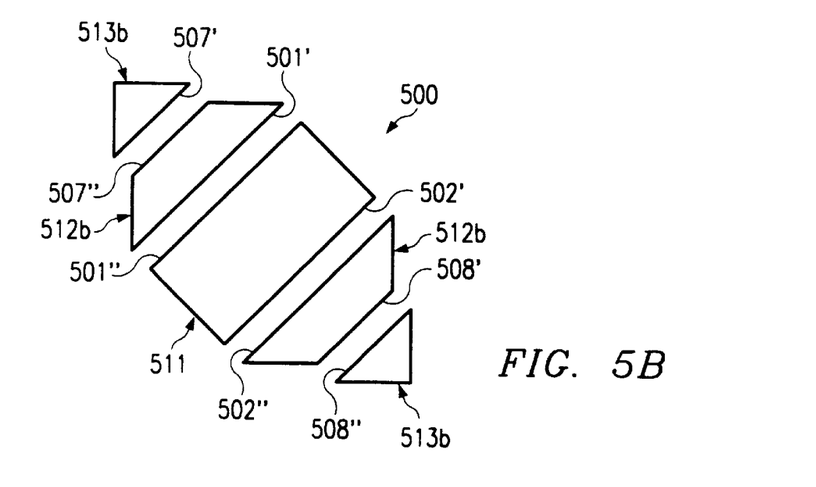

FIG. 5B depicts the five sub-elements 511, 512a, 512b, 513a, and 513b used to construct the PBS 400. Note that the BS surface 501 could be located on either sub-element 512b or 511 as depicted as 501' and 501", respectively. Similarly, the BS surface 502 could be located on either sub-element 511 or 512a, as depicted as 502' and 502", respectively. Furthermore, the BS surface 507 could be located on either sub-element 513b or 512b, as depicted as 507' and 507", respectively. Also, the BS surface 508 could be located on either sub-element 512a or 513a, as depicted as 508' and 508", respectively. The five sub-elements would be attached together with a high quality optical adhesive such as high quality optical adhesive.

Figure 5C:
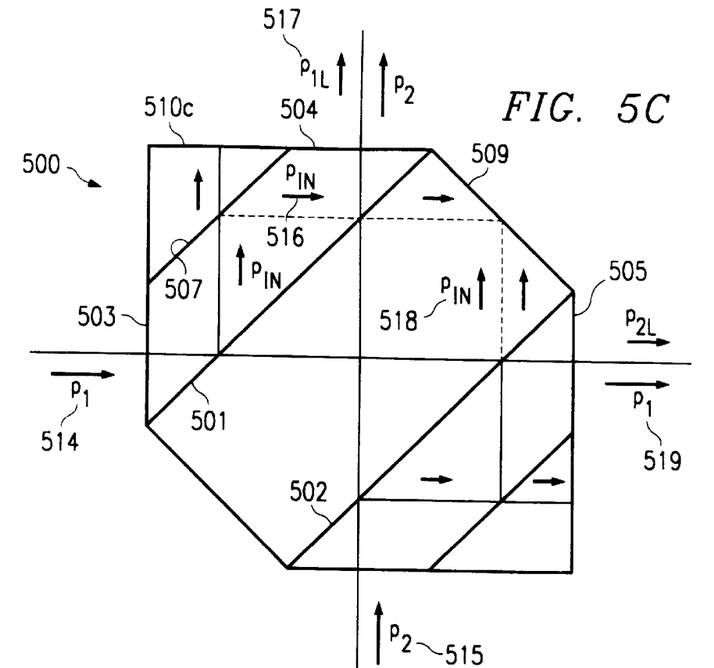

FIG. 5C depicts the passage of p light through the PBS 500 from two p input signals $p_1$ 514 and $p_2$ 515. Input $p_1$ 514 enters the PBS 500 through input surface 503 and is incident onto BS surface 501. Note that the point of incidence is off of the center of the BS surface 501. Most of the $p_1$ light passes through the BS surface, but a noise portion $p_{1N}$ 516 is deflected by the BS surface 501. This noise portion $p_{1N}$ 516 is incident onto BS surface 507, where most of the light passes through BS surface 507 and is incident onto noise surface 510c where it is removed from the PBS 500. A portion of this noise is deflected from BS surface 507 to be incident onto BS surface 501. Most of the noise portion $p_{1N}$ 516 passes through the BS surface 501 and is incident onto noise surface 509 where it is removed from the PBS 500. Some of noise portion $p_{1N}$ 516 is deflected by BS surface 501 and exits the PBS 500 as leakage noise $p_{1L}$ 517 along with the $p_2$ signal 515 through output surface 504. This noise portion $p_{1L}$ 517 is crosstalk noise with respect to the second input signal $p_2$, as this noise is a portion of the first input signal $p_1$. Note that the noise portion $p_{1L}$ 517 has resulted from the passage of light through three BS surfaces (as depicted here, through surface 501 twice and surface 507 once). Since the Rs/Rp extinction ratio is 20 dB per BS surface, $p_{1L}$ 517 has 60 dB.

After passing through BS 501, most of the $p_1$ input light is incident onto the second BS surface 502. Note that the point of incidence is off of the center of the BS surface 502. Most of the p light passes through BS 502 and exits the PBS 500 through output surface 505 as $p_1$ signal 519, but a noise portion $p_{1N}$ 518 is deflected by the BS surface 502 and is incident onto noise surface 509 where it is removed from the PBS 500. The signal path for the second input $p_2$ 515 follows a similar path, but involves surfaces 506, 502, 501, 504, 508, 505, and 509. Thus, the PBS 500 results in a high extinction ratio PBS as the element extinction ratio for Rs/Rp>60 dB.

Figure 5D:
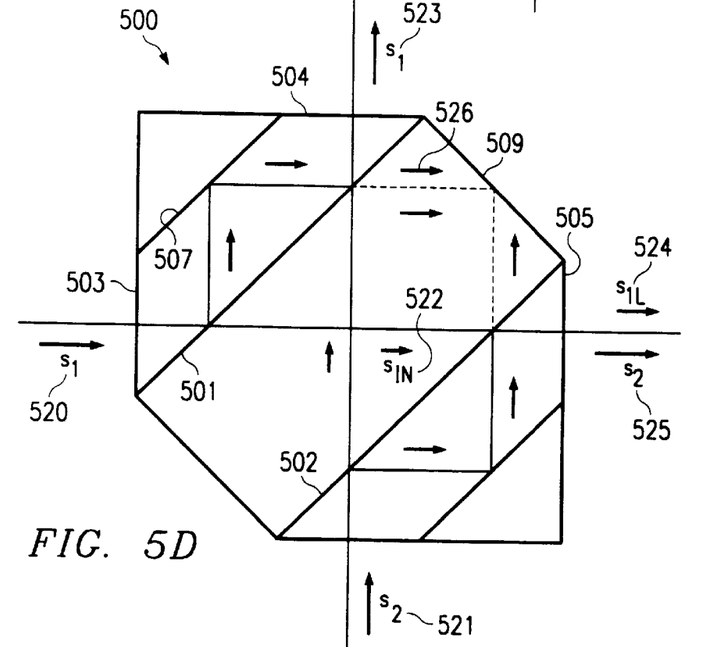

FIG. 5D depicts the passage of s light through the PBS 500 from two s input signals $s_1$ 520 and $s_2$ 521. Input $s_1$ 520 enters the PBS 500 through input surface 503 and is incident onto BS surface 501. Note that the point of incidence is off of the center of the BS surface 501. Most of the s light is deflected by the BS surface 501, and is incident onto the BS surface 507, wherein most of the light is deflected by the BS surface 507, and again is incident onto BS surface 501. Most of the incident portion is again deflected by the BS surface 501 where it exits the PBS 500 through output surface 504 as $s_1$ signal 523. Note that at the first deflection, a portion of the $s_1$ input signal passes through the BS surface 501 as noise $s_{1N}$ 522. This noise is incident onto the BS surface 502, where most of the noise is deflected onto noise surface 509 where it is removed from the PBS 500. Some of noise portion $s_{1N}$ 522 passes through the BS surface 502 and exits the PBS 500 as leakage noise $s_{1L}$ 524 along with the $s_2$ signal 525 through output surface 505. This noise portion $s_{1L}$ 524 is crosstalk noise with respect to the second input signal $s_2$, as this noise is a portion of the first input signal $s_1$. Note that the noise portion $s_{1L}$ 524 has resulted from the passage of light through two BS surfaces. Since the Tp/Ts extinction ratio is 40 dB per BS surface, $s_{1L}$ 524 has 80 dB. At the second incidence of the BS surface 501, a portion of the light passes through BS surface 501 as noise 526. This noise is incident onto the noise surface 509 where it is removed from the PBS 500. The signal path for the second input $s_2$ 521 follows a similar path, but involves surfaces 506, 502, 508, 505, 501, 504, and 509. Thus, the PBS 500 results in a high extinction ratio PBS as the element extinction ratio for Tp/Ts>80 dB.

Figure 6:
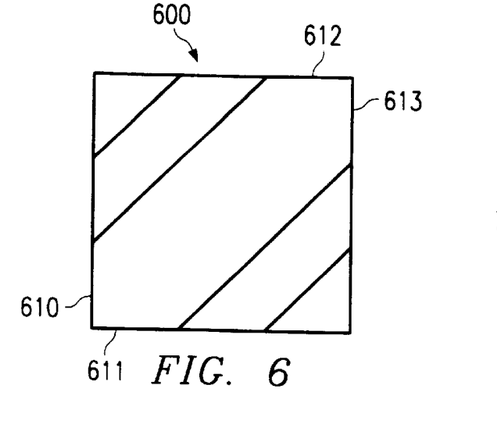
FIG. 6 depicts a cube version of the PBS of FIGS. 5A to 5D.

FIG. 6 depicts another embodiment of the inventive PBS. This embodiment is similar to that of FIG. 5 except that noise surfaces 509A and 509B of FIG. 5 have been split into two separate surfaces 610, 611, 612, and 613, such that the PBS 600, when assembled forms a cube.

Figure 7A:
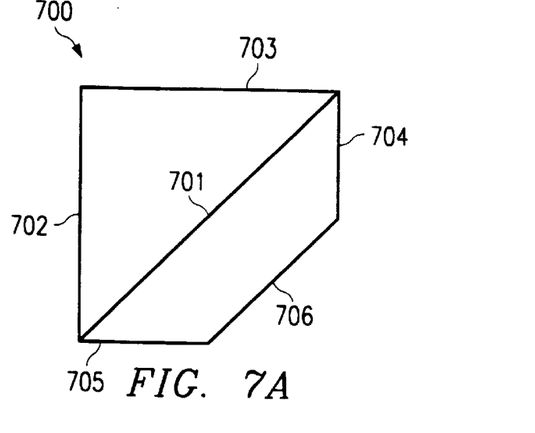
FIGS. 7A to 7C depicts a single BS surface embodiment of the inventive PBS.
Figure 7B:
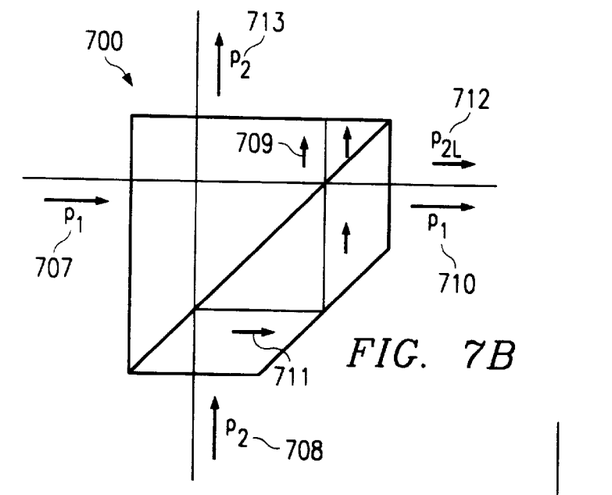
Figure 7C:
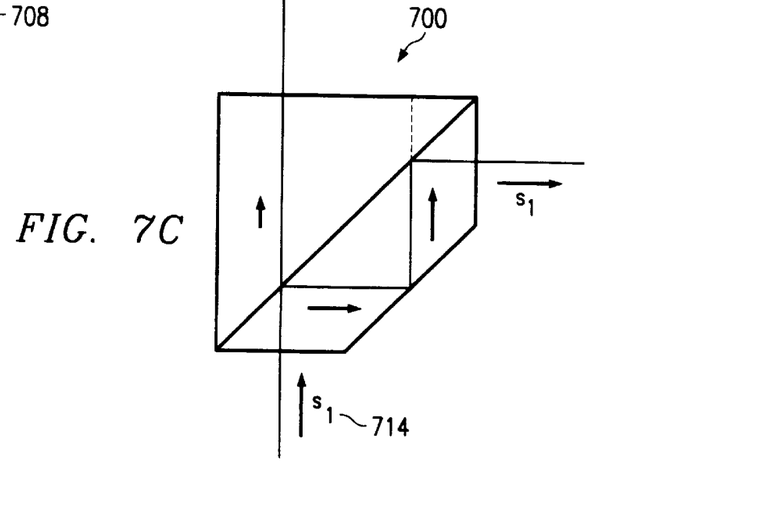

FIGS. 7A to 7C depicts another embodiment of the inventive PBS. This embodiment provides high extinction ratios for three polarization inputs. The PBS 700 is comprised of a high quality glass, such as SF-11 glass, however a high quality plastic could be used if transmission loss is low.

As shown in FIG. 7A, this PBS includes a single beamsplitting (BS) surface 701. This BS surface 701 is coated with multi-layer dielectric films, to form the polarization BS surface. The surface quality of this surface should exceed 40:20. This surface would have extinction ratios of Tp/Ts>40 dB and Rs/Rp>20 dB. The PBS 700 further includes four input/output surfaces 702, 703, 704, 705. These surfaces should have an anti-reflective (AR) coating to minimize light loss from reflection during input into and output from the PBS 700. The surface quality of these surfaces should exceed 40:20. The PBS 700 also includes a reflective surface 706. This surface is used to pass the p noise signals and the s signals through the BS surface 701 multiple times. This reflective surface also should have surface qualities that exceed 40:20. This PBS 700 is constructed from two sub-elements. The BS surface 701 could be located on either sub-element. The two sub-elements would be attached together with a high quality optical adhesive such as high quality optical adhesive.

FIG. 7B depicts the passage of p light through the PBS 700 from two p input signals $p_1$ 707 and $p_2$ 708. Input $p_1$ 707 enters the PBS 700 through input surface 702 and is incident onto BS surface 701. Note that the point of incidence is off of the center of the BS surface 701. Most of the p light passes through the BS surface 701, but a noise portion 709 is deflected by the BS surface 701. This noise portion 709 is incident onto output surface 703, however it is off-axis with respect to the collection point for the P2 signal, and thus will not be collected, and thus is removed from the PBS 700. This portion of the surface 703 could also be ground and/or coated with an absorption material to block the noise portion 709. Thus, no noise should leak through to form crosstalk noise with respect to the second input signal $p_2$. After passing through BS 701, most of the $p_1$ input light is incident onto the output surface 704 and exits the PBS 700 as $p_1$ signal 710. The second p input signal 708 enters the PBS 700 through input surface 705 and is incident onto BS surface 701. Note that the point of incidence is off of the center of the BS surface 701. Most of the p light passes through the BS surface and exits the PBS 700 through output surface 703 as $p_2$ signal 713, but a noise portion 711 is deflected by the BS surface. This noise portion 711 is reflected by reflection surface 706 and again is incident onto BS surface 701. Most of the noise portion passes through the BS surface and exits the beamsplitter similar to noise 709. Some of noise portion 711 is deflected by BS surface 701 and exits the PBS 700 as leakage noise $p_{2L}$ 712 along with the $p_1$ signal 710 through output surface 704. This noise portion $p_{2L}$ 712 is crosstalk noise with respect to the first input signal $p_1$, as this noise is a portion of the second input signal $p_2$. Note that the noise portion $p_{2L}$ 712 has resulted from the passage of light through two BS surfaces (as depicted here, through the same surface twice). Since the Rs/Rp extinction ratio is 20 dB per BS surface, p $p_{2L}$ 712 has 40 dB. Thus, the PBS 700 results in a high extinction ratio PBS as the element extinction ratio for Rs/Rp>40 dB.

FIG. 7C depicts the passage of s light through the PBS 700 from a single s input signal $s_1$ 714. Since only one signal is passing through the PBS 700, then no crosstalk can occur. An application for PBS 700 can be found in Attorney Docket Number 55872P043CP1-993120, entitled "FIBER OPTIC SMART SWITCH," which is hereby incorporated herein by reference.

Figure 8A:
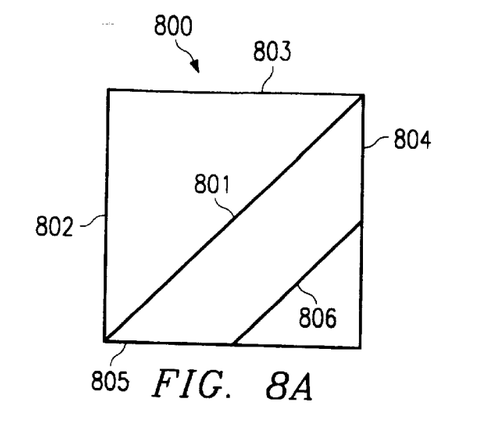
FIGS. 8A to 8C depict a double BS surface embodiment of the inventive PBS.
Figure 8B:
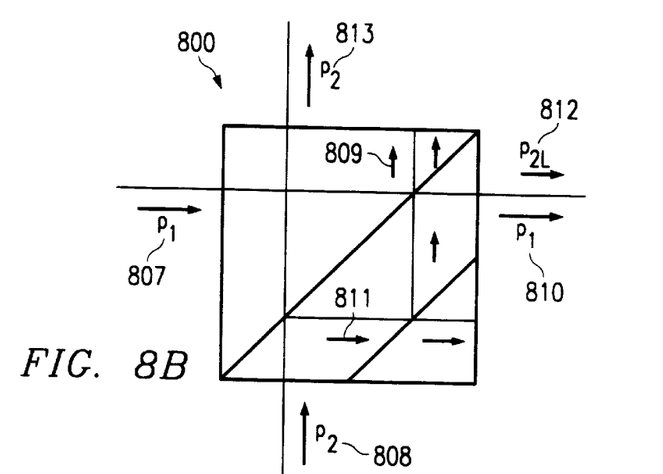
Figure 8C:
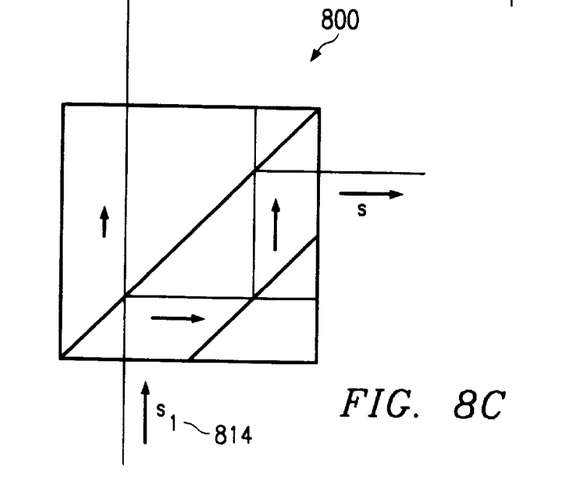

FIGS. 8A to 8C depict another embodiment of the inventive PBS. This embodiment provides high extinction ratios for three polarization inputs. The PBS 800 is comprised of a high quality glass, such as SF-11 glass, however a high quality plastic could be used if transmission loss is low.

As shown in FIG. 8A, this PBS includes two beamsplitting (BS) surfaces 801 and 806. These BS surfaces are coated with multi-layer dielectric films, to form the polarization BS surface. The surface quality of these surfaces should exceed 40:20. These surfaces would have extinction ratios of Tp/Ts>40 dB and Rs/Rp>20 dB. The PBS 800 further includes four input/output surfaces 802, 803, 804, 805. These surfaces should have an anti-reflective (AR) coating to minimize light loss from reflection during input into and output from the PBS 800. The surface quality of these surfaces should exceed 40:20. This PBS 800 is constructed from three sub-elements. The BS surface 801 could be located on either of its adjacent subelements. The BS surface 806 could be located on either of its adjacent sub-elements. The three sub-elements would be attached together with a high quality optical adhesive such as high quality optical adhesive.

In a preferred embodiment PBS 800 is approximately 8 millimeters (mm) in height, approximately 8 mm in length, and approximately 5 mm in depth. Thus, in a most preferred embodiment sides 802, 803, 804, and 805 are approximately 8 mm each, and PBS 800 has a depth or thickness of approximately 5 mm. Further, in a most preferred embodiment input/output surfaces 802, 803, 804, and 805 have a quality of approximately 40:20. Additionally, in a most preferred embodiment the surface quality of the faces of PBS 800 are a fine grind or of any other quality. It should be understood, that other embodiments disclosed herein can have similar specifications as provided for the components of PBS 800.

FIG. 8B depicts the passage of p light through the PBS 700 from two p input signals $p_1$ 807 and P2 808. Input $p_1$ 807 enters the PBS 800 through input surface 802 and is incident onto BS surface 801. Note that the point of incidence is off of the center of the BS surface 801. Most of the p light passes through the BS surface 801, but a noise portion 809 is deflected by the BS surface 801. This noise portion 809 is incident onto output surface 803, however it is off-axis with respect to the collection point for the $p_2$ signal, and thus will not be collected, and thus is removed from the PBS 800. This portion of the surface 803 could also be ground and/or coated with an absorption material to block the noise portion 809. Thus, no noise should leak through to form crosstalk noise with respect to the second input signal $p_2$. After passing through BS 801, most of the $p_1$ input light is incident onto the output surface 804 and exits the PBS 800 as $p_1$ signal 810.

The second p input signal 808 enters the PBS 800 through input surface 805 and is incident onto BS surface 801. Note that the point of incidence is off of the center of the BS surface 801. Most of the p light passes through the BS surface 801 and exits the PBS 800 through output surface 803 as $p_2$ signal 813, but a noise portion 811 is deflected by the BS surface 801. This noise portion 811 is incident onto BS surface 806, where most of the light pass through the surface 806 and falls onto surface 804, but is off axis with the collection point of the $p_1$ signal 810. A portion of this light 811 is deflected by BS surface 806 and is again incident onto BS surface 801. Most of the noise portion passes through the BS surface and exits the beamsplitter similar to noise 809. Some of noise portion is deflected by BS surface and exits the PBS 800 as leakage noise $p^{2L}$ 812 along with the $p_1$ signal 810 through output surface 804. This noise portion $p_{2L}$ 812 is crosstalk noise with respect to the first input signal $p_2$, as this noise is a portion of the second input signal $p_2$. Note that the noise portion $p_{2L}$ 812 has resulted from the passage of light through three BS surfaces (as depicted here, through the surface 801 twice and surface 806 once). Since the Rs/Rp extinction ratio is 20 dB per BS surface, $p_{2L}$ 812 has 60 dB. Thus, the PBS 800 results in a high extinction ratio PBS as the element extinction ratio for Rs/Rp>60 dB.

FIG. 8C depicts the passage of s light through the PBS 800 from a single s input signal $s_1$ 814. Since only one signal is passing through the PBS 800, then no crosstalk can occur. An application for PBS 700 can be found in Attorney Docket Number 55872-P043CP1-993120, entitled "FIBER OPTIC SMART SWITCH," which is hereby incorporated herein by reference.

Figure 9A:
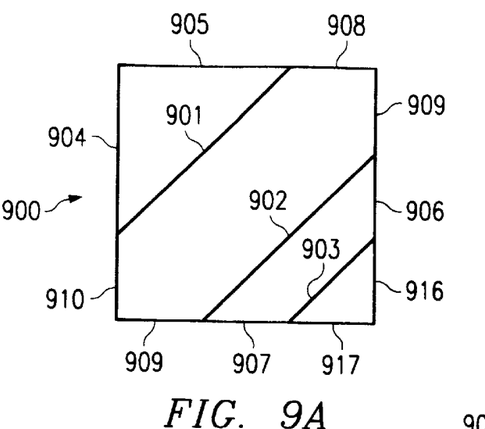
FIGS. 9A to 9C depict a triple BS surface embodiment of the inventive PBS.
Figure 9B:
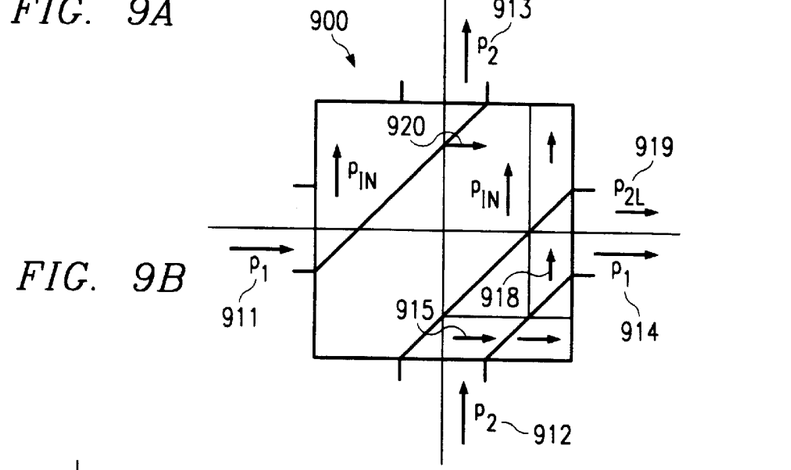
Figure 9C:
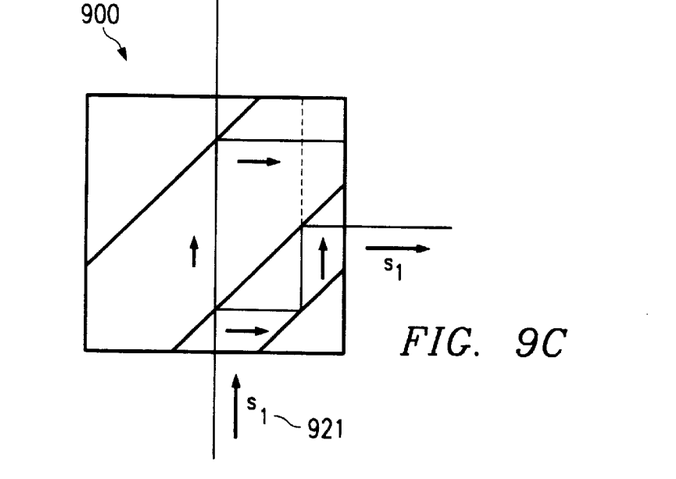

FIGS. 9A to 9C depicts another embodiment of the inventive PBS 900. The PBS 900 is comprised of a high quality glass, such as SF-11 glass, however a high quality plastic could be used if transmission loss is low.

As shown in FIG. 9A, this PBS includes three beamsplitting (BS) surfaces 901, 902, and 903. These BS surfaces would be coated with multi-layer dielectric films, to form polarization BS surfaces. The surface quality of these surfaces should exceed 40:20. Both surfaces would have extinction ratios of Tp/Ts>40 dB and Rs/Rp>20 dB. The PBS 900 further includes four input/output surfaces 904, 905, 906, and 907. These surfaces should have an anti-reflective (AR) coating to minimize light loss from reflection during input into and output from the PBS 900. The surface quality of these surfaces should exceed 40:20. The remaining surfaces 908, 909, 910, 911, 916, and 917 are the noise surfaces, to which a large portion of noise are directed by the interaction of the BS surfaces. These surfaces could be ground and/or coated with a light absorbing material, or left bare. This PBS 900 is constructed from four sub-elements. Each of the BS surfaces could be located on either of their respective adjacent sub-elements. The three sub-elements would be attached together with a high quality optical adhesive such as a high quality optical adhesive.

FIG. 9B depicts the passage of p light through the PBS 900 from two p input signals $p_1$ 911 and $p_2$ 912. Input $p_1$ 911 enters the PBS 900 through input surface 904 and is incident onto BS surface 901. Note that the point of incidence is off of the center of the BS surface 901. Most of the p light passes through the BS surface, but a noise portion $p_{1N}$ is deflected by the BS surface, and is incident onto surface 905 but is off axis with respect to the collection point for signal $p_2$ 913. This portion of the surface 905 could also be ground and/or coated with an absorption material to block the noise portion. Most of the light passes through the BS surface 901 and is incident on to BS surface 902. Most of the light passes through BS surface 902 to exit the PBS 900 as signal $p_1$ 914 through output surface 906. Some is deflected by BS surface 902, it is incident onto noise surface 908, where it is removed from the PBS 900. Thus, no noise should leak through to form crosstalk noise with respect to the second input signal $p_2$.

The second p input signal $p_2$ 912 enters the PBS 900 through input surface 907 and is incident onto BS surface 902. Note that the point of incidence is off of the center of the BS surface 902. Most of the p light passes through the BS surface 902 and is incident on BS surface 901, most of this light passes through the BS surface 901 and exits the PBS 900 through output surface 905 as $p_2$ signal 913. During the incidence with BS surface 902, a portion 915 of the $p_2$ input signal is deflected toward BS surface 903. Most of this portion 915 passes through BS surface 902 and is incident on noise surface 916 where it exits the PBS 900. However, a small portion 918 of noise 915 is deflected by BS surface 903 and is incident on BS surface 902, where most of the light of 918 passes through and is incident on noise surface 908 which removes it from the PBS 900. A small portion of 918 is deflected by the BS surface 902 and is incident onto output surface 906 and exits the PBS 900 as leakage noise $p_{2L}$ 919 along with the $p_1$ signal 914 through output surface 906. This noise portion $P_{2L}$919 is crosstalk noise with respect to the first input signal $p_1$, as this noise is a portion of the second input signal $p_2$. Note that the noise portion $p_{2L}$ 919 has resulted from the passage of light through three BS surfaces (as depicted here, through the surface 902 twice and surface 903 once). Since the Rs/Rp extinction ratio is 20 dB per BS surface, $p_{2L}$ 919 has 60 dB. During the incidence with BS surface 901, a portion 920 of the $p_2$ input signal is deflected by BS surface 901 and is incident on noise surface 909 which removes it from the PBS 900. Thus, the PBS 900 results in a high extinction ratio PBS as the element extinction ratio for Rs/Rp>60 dB.

It should be understood that in a most preferred embodiment the operating wave length for the PBS is approximately 1520–1570 nanometers (nm). Additionally, in a most preferred embodiment SF11 or its equivalent is used for the glass type of the PBS. Further, in a most preferred embodiment the AR coating surface has R<0.2% for wavelengths from approximately 1500–1600 nm. Also, in a most preferred embodiment the PBS has a transmitted wavefront distortion of <approximately ¼ wave at approximately 632.8 nm.

FIG. 9C depicts the passage of s light through the PBS 900 from a single s input signal $s_1$ 921. Since only one signal is passing through the PBS 900, then no crosstalk can occur.

The inventive high extinction ratio polarization beamsplitter can be used in many optical systems such as circulators, isolators, switches, or any other polarization based optical components, including fiber optics components.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A polarized beamsplitter receiving at least one input light beam and outputting at least one output light beam, said polarized beamsplitter comprising:
   a first polarized beamsplitting surface;
   a second polarized beamsplitting surface that is aligned parallel to said first polarized beamsplitting surface;
   a first input surface oblique to said first polarized beamsplitting surface that receives a first input light beam having a center axis; and
   said center axis of said first input light beam incident on said first polarized beamsplitting surface at a point that is not the center point of said first polarized beamsplitting surface.

2. The polarized beamsplitter of claim 1, wherein said first polarized beamsplitting surface and said second polarized beamsplitting surface arranged such that the polarized beamsplitter has an extinction ratio greater than 40 dB.

3. The polarized beamsplitter of claim 1, further comprising:
   a second input surface oblique to said first polarized beamsplitting surface that receives a second input light beam having a center axis; and
   said center axis of said second input light beam incident on said first polarized beamsplitting surface at a point that is not the center of said first polarized beamsplitting surface.

4. The polarized beamsplitter of claim 3, wherein said center axis of said first input light beam and said center axis of said second input light beam have a cross point that is not incident to said first polarized beamsplitting surface and that is not incident to said second beamsplitting surface.

5. The polarized beamsplitter of claim 3, further comprising:
   if said first input light beam is a horizontal signal (p), then said first polarized beamsplitting surface transmits said first input light beam and reflects a first amount of leakage of said first input light beam;
   if said second input light beam is a horizontal signal (p), then said first polarized beamsplitting surface transmits said second input light beam and reflects a first amount of leakage of said second input light beam;
   if said first input light beam is a vertical signal (s), then said first polarized beamsplitting surface reflects said first input light beam and transmits a second amount of leakage of said first input light beam; and
   if said second input light beam is a vertical signal (s), then said first polarized beamsplitting surface reflects said second input light beam and transmits a second amount of leakage of said second input light beam.

6. The polarized beamsplitter of claim 5, wherein said first amount of leakage of said first input light beam is approximately 20 dB, said first amount of leakage of said second input light beam is approximately 20 dB, said second amount of leakage of said first input light beam is approximately 40 dB, and said second amount of leakage of said second input light beam is approximately 40 dB.

7. The polarized beamsplitter of claim 5, wherein said first input light beam and said second input light beam are each horizontal signals (p), further comprising:

said first polarized beamsplitting surface transmitting said first input light beam and reflecting a first leakage amount of said first input light beam;
said first polarized beamsplitting surface transmitting said second input light beam and reflecting a second leakage amount of said second input light beam;
said first leakage amount of said first input light beam being reflected by said first polarized beamsplitting surface in a manner that is not co-linear with said transmitted second input light beam;
said second leakage amount of said second input light beam being incident on said second polarized beamsplitting surface;
said second polarized beamsplitting surface transmitting said second leakage amount of said second input light beam and reflecting a third leakage amount of said second leakage amount of said second input light beam;
said third leakage amount of said second leakage amount of said second input light beam being incident on said first polarized beamsplitting surface;
said first polarized beamsplitting surface transmitting said third leakage amount of said second leakage amount of said second input light beam and reflecting a fourth leakage amount of said third leakage amount of said second leakage amount of said second input light beam; and
said third leakage amount of said second leakage amount of said second input light beam being transmitted by said first polarized beamsplitting surface in a manner that is not colinear with said transmitted first input light beam.

8. The polarized beamsplitter of claim 1, further comprising:
   said first input light beam is a vertical signal (s);
   said first polarized beamsplitting surface reflecting said first input light beam such that said the reflected first input light beam is incident on said second polarized beamsplitting surface and transmitting a first leakage amount of said first input light beam;
   said second polarized beamsplitting surface further reflecting said reflected first input light beam such that said reflected first input light beam is incident on said first polarized beamsplitting surface and transmitting a second leakage amount of said reflected first input light beam; and
   said first polarized beamsplitting surface further reflecting said reflected first input light beam and transmitted a third leakage amount of said reflected first input light beam.

9. The polarized beamsplitter of claim 1, further comprising:
   a third polarized beamsplitting surface that is aligned parallel to said first polarized beamsplitting surface and said second beamsplitting surface.

10. The polarized beamsplitter of claim 9, further comprising:
    a fourth polarized beamsplitting surface that is aligned parallel to said first polarized beamsplitting surface and said second polarized beamsplitting surface and said third polarized beamsplitting surface.

11. The polarized beamsplitter of claim 1, further comprising:
    at least one removing surface that is arranged to remove noise.

12. A polarized beamsplitter receiving at least one input light beam and outputting at least one output light beam, said polarized beamsplitter comprising:

a first polarized beamsplitting surface;

a second polarized beamsplitting surface that is aligned parallel to said first polarized beamsplitting surface;

a first input surface oblique to said first polarized beamsplitting surface that receives a first input light beam having a center axis;

a second input surface oblique to said first polarized beamsplitting surface that receives a second input light beam having a center axis; and said center axis of said first input light beam and said center axis of said second input light beam having a cross point, wherein said cross point is not incident to said first polarized beamsplitting surface and is not incident to said second polarized beamsplitting surface.

13. The polarized beamsplitter of claim 12, wherein said first polarized beamsplitting surface and said second polarized beamsplitting surface arranged such that the polarized beamsplitter has an extinction ratio greater than 40 dB.

14. The polarized beamsplitter of claim 12, further comprising:

if said first input light beam is a horizontal signal (p), then said first polarized beamsplitting surface transmits said first input light beam and reflects a first amount of leakage of said first input light beam;

if said second input light beam is a horizontal signal (p), then said first polarized beamsplitting surface transmits said second input light beam and reflects a first amount of leakage of said second input light beam;

if said first input light beam is a vertical signal (s), then said first polarized beamsplitting surface reflects said first input light beam and transmits a second amount of leakage of said first input light beam; and if said second input light beam is a vertical signal (s), then said first polarized beamsplitting surface reflects said second input light beam and transmits a second amount of leakage of said second input light beam.

15. The polarized beamsplitter of claim 14, wherein said first amount of leakage of said first input light beam is approximately 20 dB, said first amount of leakage of said second input light beam is approximately 20 dB, said second amount of leakage of said first input light beam is approximately 40 dB, and said second amount of leakage of said second input light beam is approximately 40 dB.

16. The polarized beamsplitter of claim 14, wherein said first input light beam and said second input light beam are each horizontal signals (p), further comprising:

said first polarized beamsplitting surface transmitting said first input light beam and reflecting a first leakage amount of said first input light beam;

said first polarized beamsplitting surface transmitting said second input light beam and reflecting a second leakage amount of said second input light beam;

said first leakage amount of said first input light beam being reflected by said first polarized beamsplitting surface in a manner that is not co-linear with said transmitted second input light beam;

said second leakage amount of said second input light beam being incident on said second polarized beamsplitting surface;

said second polarized beamsplitting surface transmitting said second leakage amount of said second input light beam and reflecting a third leakage amount of said second leakage amount of said second input light beam;

said third leakage amount of said second leakage amount of said second input light beam being incident on said first polarized beamsplitting surface;

said first polarized beamsplitting surface transmitting said third leakage amount of said second leakage amount of said second input light beam and reflecting a fourth leakage amount: of said third leakage amount of said second leakage amount of said second input light beam; and said third leakage amount of said second leakage amount of said second input light beam being transmitted by said first polarized beamsplitting surface in a manner that is not colinear with said transmitted first input light beam.

17. The polarized beamsplitter of claim 12, further comprising:

said first input light beam is a vertical signal (s);

said first polarized beamsplitting surface reflecting said first input light beam such that said the reflected first input light beam is incident on said second polarized beamsplitting surface and transmitting a first leakage amount of said first input light beam;

said second polarized beamsplitting surface further reflecting said reflected first input light beam such that said reflected first input light beam is incident on said first polarized beamsplitting surface and transmitting a second leakage amount of said reflected first input light beam; and said first polarized beamsplitting surface further reflecting said reflected first input light beam and transmitted a third leakage amount of said reflected first input light beam.

18. The polarized beamsplitter of claim 12, further comprising:

a third polarized beamsplitting surface that is aligned parallel to said first polarized beamsplitting surface and said second beamsplitting surface.

19. The polarized beamsplitter of claim 18, further comprising:

a fourth polarized beamsplitting surface that is aligned parallel to said first polarized beamsplitting surface and said second polarized beamsplitting surface and said third polarized beamsplitting surface.

20. The polarized beamsplitter of claim 12, further comprising:

at least one removing surface that is arranged to remove noise.

* * * * *

UNITED STATES PATENT AND TRADEMARK OFFICE
CERTIFICATE OF CORRECTION

PATENT NO.  : 6,160,665
DATED       : December 12, 2000
INVENTOR(S) : Shifu Yuan Page 1 of 1

It is certified that error appears in the above-identified patent and that said Letters Patent is hereby corrected as shown below:

Column 1,
Line 2, please insert heading, "Government Interests"

As a separate paragraph, after the heading, please insert the following:

The invention was made with Government support under Contract BMDO II: DASG-60-98-C-0065 awarded by U.S. Army Space & Missile Defense Command, CONTR & ACQ MGT OFC/SMDC-CM-CK, P.O. BOX 1500, Huntsville, AL 35807. The Government has certain rights in the invention.

Signed and Sealed this

Twenty-fifth Day of December, 2001

*Attest:*

JAMES E. ROGAN
*Attesting Officer*   *Director of the United States Patent and Trademark Office*